(12) United States Patent
Morris et al.

(10) Patent No.: US 6,434,650 B1
(45) Date of Patent: Aug. 13, 2002

(54) APPARATUS AND METHOD FOR MULTIPLEXING BI-DIRECTIONAL DATA ONTO A LOW PIN COUNT BUS BETWEEN A HOST CPU AND CO-PROCESSOR

(75) Inventors: Jeff C. Morris, Cornelius; Robert J. Greiner, Beaverton, both of OR (US); Narayana S. Iyer, Davis, CA (US); Pranav H. Mehta, Chandler, AZ (US); Shreekant Thakkar, Portland, OR (US); Peter Ruscito, Falsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/176,571

(22) Filed: Oct. 21, 1998

(51) Int. Cl.[7] ............................................. G06F 13/00
(52) U.S. Cl. .................. 710/110; 710/72; 710/107; 710/113; 710/303
(58) Field of Search ............................. 710/110, 303, 710/113, 107, 72; 709/208, 245

(56) References Cited

U.S. PATENT DOCUMENTS

| | | | |
|---|---|---|---|
| 5,257,356 A | | 10/1993 | Brockmann et al. |
| 5,444,847 A | * | 8/1995 | Iitsuka ........................ 710/107 |
| 5,459,840 A | | 10/1995 | Isfeld et al. |
| 5,467,295 A | | 11/1995 | Young et al. |
| 5,535,333 A | | 7/1996 | Allen, Jr. et al. |
| 5,600,803 A | * | 2/1997 | Iitsuka et al. ................ 709/208 |
| 5,819,052 A | * | 10/1998 | Sonoda ........................ 710/113 |

OTHER PUBLICATIONS

U.S. Patent Application entitled, "Method and System for Implementing Control Signals on a Low Pin Count Bus", Serial No.: 09/223,302, filed Dec. 30, 1998, Inventors: Morriss et al.

* cited by examiner

*Primary Examiner*—Ly V. Hua
(74) *Attorney, Agent, or Firm*—Blakely, Sokoloff, Taylor & Zafman LLP

(57) ABSTRACT

An apparatus and method for communication between a host CPU and a security co-processor are disclosed, in which a bus having a bi-directional data and command bus, a bi-directional control line, and a uni-directional clock line, is coupled to the CPU and to the co-processor. The bus supports data transfer between the CPU and the co-processor, including read operations and write operations, where each such operation includes a command phase, a data transfer phase, and an error check phase. The CPU and the co-processor have a dual master slave mode wherein either may be master of the bus, while the other is the slave. The bi-directional data and command bus carries command information from the master to the slave 10 during the command phase, and carries data from the master to the slave during the data transfer phase for a write operation, and from the slave to the master for a read operation. The bi-directional control line specifies the start and end of each transfer. The uni-directional clock line synchronously clocks both the bi-directional data and command bus and the bi-directional control line. Data is transferred a packet at a time; each packet consists of an octet of data, which 15 is transferred during 8 clocks. Flow control need only be applied once for each packet of data, and thus, only once per 8 clocks.

33 Claims, 6 Drawing Sheets

APPARATUS AND METHOD FOR MULTIPLEXING BI-DIRECTIONAL DATA ONTO A LOW PIN COUNT BUS BETWEEN A HOST CPU AND CO-PROCESSOR

BACKGROUND OF THE INVENTION

1. Field of the Invention

This invention relates generally to communication between two computer processors. More particularly, the present invention relates to an apparatus and method for communication between a host CPU and a security co-processor, in which bi-directional data is multiplexed onto a low pin count bus.

2. Description of the Related Art

The general availability of high quality computers and computer memory, at relatively low costs, have resulted in computers being used in many varied applications throughout the world. Computers have become common business tools used in many aspects of the world economy, and their applications continue to expand and grow. One such application is the communication of data from one geographic location to another, with the geographic locations sometimes being separated by international boundaries. Such communications inherently suffer from the risk of potential interception by unauthorized third parties. Such unauthorized interception obviously poses security risks to the communication of confidential information.

While it is impossible to render the communication airways or transmission lines secure from third-party interception, the data transmitted may be encrypted so as to render varying degrees of protection to the content of the data transmitted. Various encryption techniques have been developed and generally implemented in software, and such software generally executed by a computer processor. Such systems, however, suffer from limitations inherent to the types of processors used, the types of memory used, the manner in which information is communicated from the processor to the memory and then stored in the memory, the ability of floating point instructions and execution units to carry out certain encryption ciphers, and so forth.

A solution having far greater security is one in which a security co-processor, having nonvolatile memory on board, is used, in conjunction with a host CPU. The co-processor can be particularly designed to efficiently perform the numerous shifts and exclusive-OR functions, and generate pure random numbers, typically required of sophisticated ciphers, which operations can not be efficiently and exactly performed by the processors typically used in computers and computer systems.

Because the technologies needed to manufacturer such a security co-processor are significantly different from the technologies needed to manufacture the typical computer processor, both devices cannot be fabricated on the same chip, or in the same package. Consequently, the host CPU and the security co-processor must be connected or coupled to each other by a bus. To maximize the efficiency of the system, the bus needs to have a low pin count and a high bandwidth. These requirements of low pin count and high bandwidth are at odds with each other; known systems having low pin count have low bandwidth, and known systems having high bandwidth have high pin count. For example, the PCI bus typically requires a minimum of 49 pins (a high pin count) and has a bandwidth of 133 million bytes per second (high bandwidth). One system according to the present invention has the same bandwidth but with 1/7 the number of pins: a mere seven pins (low pin count) with a 133 million bytes per second bandwidth (high bandwidth).

SUMMARY OF THE INVENTION

In one aspect of the present invention, an apparatus is provided for communication between a host CPU and a security co-processor. The present invention, however, is not limited to communication between a host CPU and a security co-processor; rather, the invention can advantageously be used for communication between any two devices between which high bandwidth communication is needed via a bus having a low pin count. Additionally, the apparatus may advantageously be used when the bus is coupled to either of the two processors or other devices via an intermediate bus or device or other interface that fans-out or fans-in the pin count.

In another aspect of the present invention, a method is provided for multiplexing bi-directional data onto a low pin count bus. Via the bus, the data is communicated between a host CPU and a security co-processor. The method of the present invention, however, is not limited to communication between a host CPU and a security co-processor; rather, the method can be advantageously used to communicate between any two devices via a low pin-count bus. Additionally, the method may advantageously be used for communication between two processors or other devices, when an intermediate bus or device or other interface is included between the low pin count bus and either or both of the two processors or other devices.

According to one aspect of the invention, there is provided a CPU, a co-processor, and a bus coupled to the CPU and to the co-processor. The bus includes a bi-directional data and command bus, a bi-directional control line, and a unidirectional clock line. According to another aspect of the invention, the CPU and the co-processor have a dual master-slave mode, in which either the CPU or the co-processor may be the master of the bus, and the other of the CPU and the co-processor is the slave. The bus, coupled to the CPU and to the co-processor, supports data transfers between the CPU and the co-processor. The data transfers include read operations and/or write operations, and each such operation includes a command phase, a data transfer phase, and an error check phase.

The bus protocol of the present invention was designed to operate efficiently over a narrow bus. While it has some of the benefits of a fixed length transmission scheme, it does not have the inherent inefficiencies of hand shakes and of flow control on each clock of data transfer. And while it has some of the benefits of a pure packet transmission scheme, it does not require the buffering and latency overhead typical of such schemes. In a typical packet protocol, flow control is performed one layer above the protocol layer, thereby requiring that the packet transmitter and receiver be capable of buffering at least one entire maximum length data transfer. The bus protocol of the present invention requires the transmitter and receiver need store no more than two octets of data each. In the present protocol the burst length is variable, which is generally not the case for fixed length transfer protocols. The overhead for write operations is fixed at four clocks, and the overhead for read operations is fixed at eight clocks in the illustrated embodiments of the present invention; as the data transfer length increases, the overhead remains the same, thereby proportionally decreasing with respect to the amount of data transferred. These and other benefits will become evident as the present invention is described more fully below.

BRIEF DESCRIPTION OF THE DRAWINGS

Other objects and advantages of the invention will become apparent upon reading the following detailed description and upon reference to the drawings in which.

Figure 1:
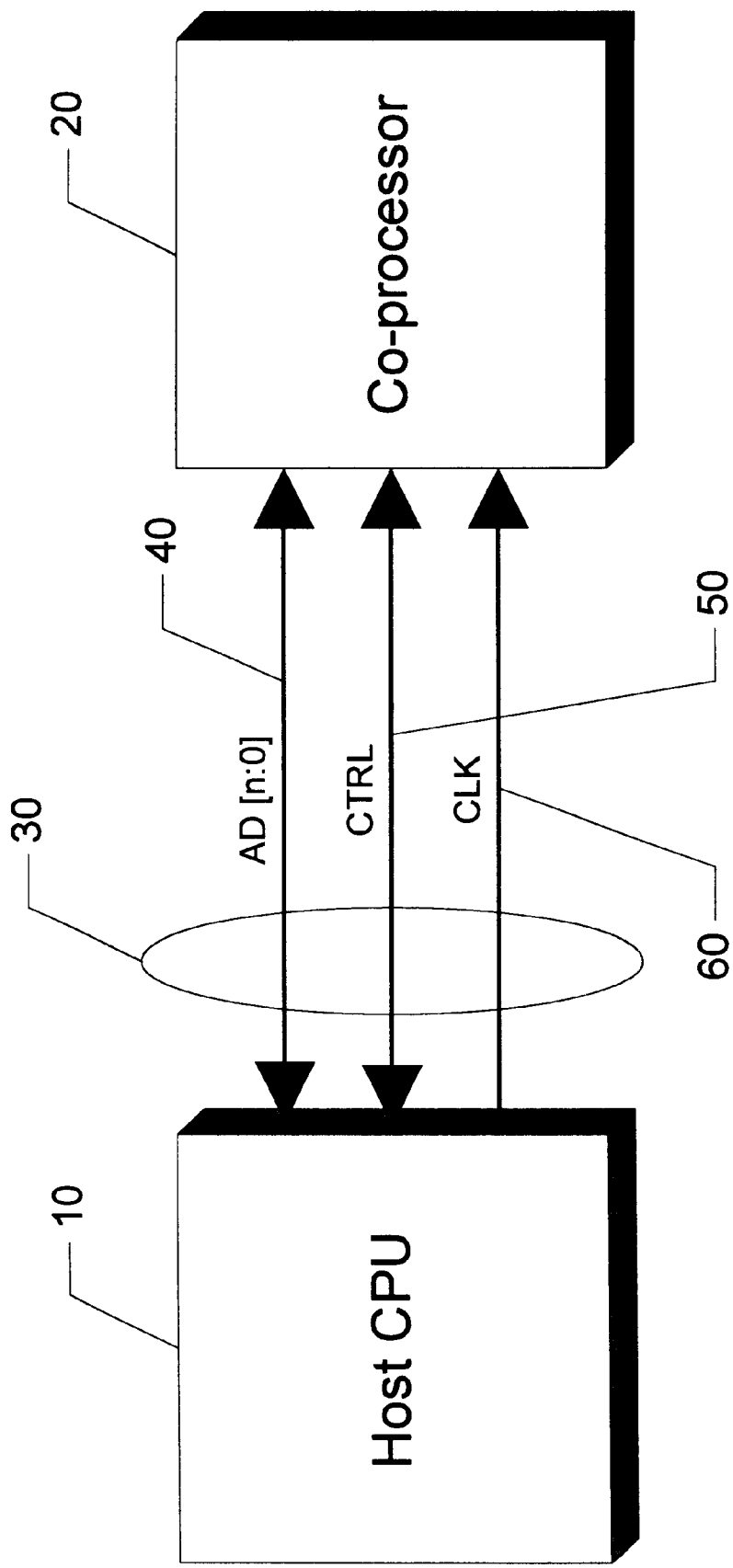
FIG. 1 and 1a are schematic block diagrams of apparatus for communication between a host CPU and a co-processor, according to embodiments of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, and in particular to FIG. 1, there is shown in block diagram form a host CPU 10 connected to a co-processor 20 via a bus 30. The co-processor 20 may be, but need not be, a security co-processor, in which case the bus 30 may be termed a security co-processor bus.

The bus 30 includes a bi-directional data and command bus 40, labeled AD[n:0] in FIG. 1; a bi-directional control line 50, labeled CTRL in FIG. 1; and a uni-directional clock line 60, labeled CLK in FIG. 1. The interface of the co-processor 20 and the bus 30 is synchronized to the interface of the host CPU 10 and the bus 30 by the clock signal on the clock line 60.

In one embodiment of the present invention, the bus 30 supports a dual master-slave mode, in which either the host CPU 10 is the master of the bus 40 and the co-processor 20 is the slave, or the co-processor 20 is the master of the bus 40 and the host CPU 10 is the slave. Upon power-up or any reset, bus ownership, that is, the status of master, is granted to the host CPU 10. The co-processor 20 may request the bus by signaling, for example, during read or write operations.

According to one aspect of the present invention, flow control, that is, control over the flow of data between the host CPU 10 and the co-processor 20, is supported for both read and write operations, and may be invoked by the co-processor 20, by the host CPU 10, or by both. In one embodiment of the present invention, data is transferred across the bus 40 in data packets consisting of eight clock cycles of data, called an octet; flow control occurs on a per octet basis for read operations and for write operations, and may be initiated either by the processor sending the data, or by the processor receiving the data. When initiated by the data receiver, flow control is performed during a fourth data transfer clock of an octet, as described below, to give the flow control information time to propagate back to the data sender. The data receiver remains capable of accepting the remainder of the data of the octet currently being transmitted, and can effectuate control at the end of transmission of that octet. Flow control by the data sender does not need time to turn around, and is performed during a fourth clock of the data transfer cycle of each octet of data, as described below. As will be apparent to those skilled in the art having benefit of the present disclosure, the data packets can have any desired number of clock cycles of data.

In one embodiment of the present invention, read operations and write operations each include three phases: a command phase; a data transfer phase; and an error check phase. The command phase specifies whether the subsequent data transfer will be a read operation or a write operation, specifies a target address, and decides whether the host CPU 10 will be the data sender and the co-processor 20 the data receiver, or the co-processor 20 the data sender and the CPU 10 the data receiver. During the data transfer phase, data is either sent or received between the CPU 10 and the co-processor via the bus 40. The error check phase provides error checking and detection of the data transmitted during the data transfer phase. In one embodiment of the present invention, a CRC or cyclic redundancy check is the type of error checking used.

Figure 1A:
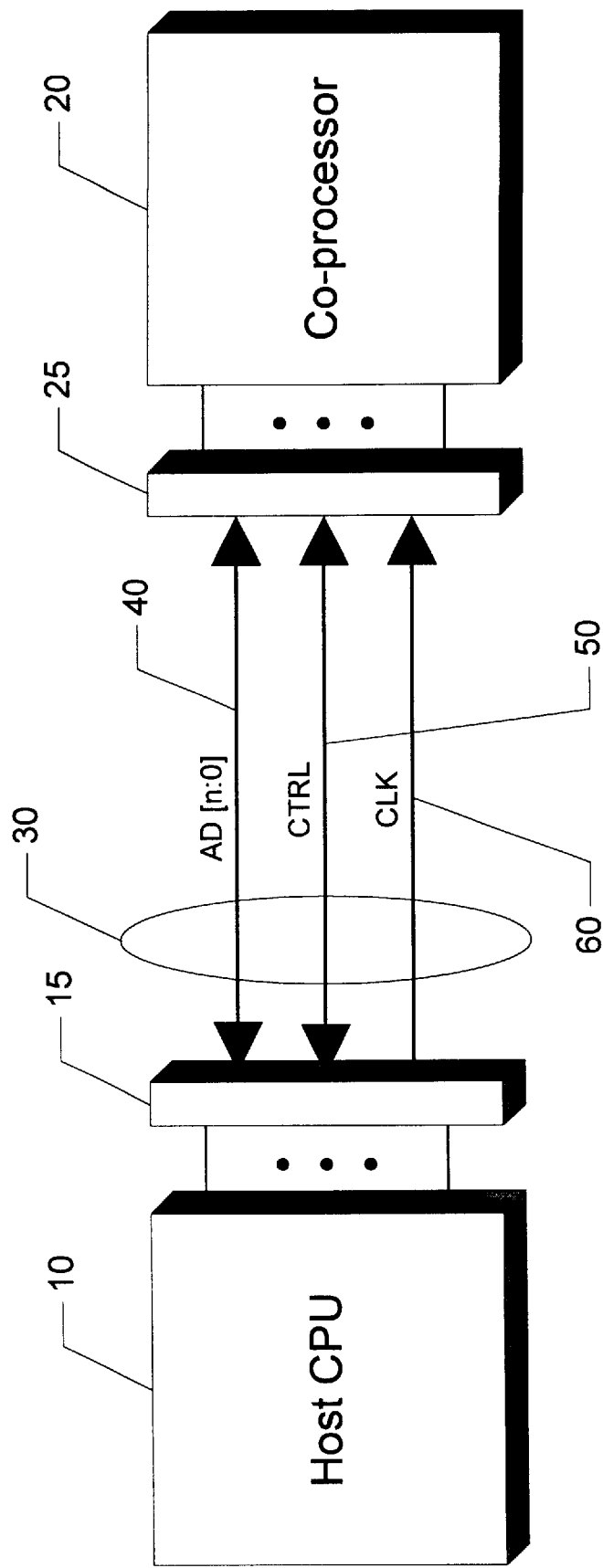

FIG. 1a illustrates an embodiment of the present invention in which the bus 30 is connected to the processor 10 via an intermediate bus or device or other interface 15 that fans-out or fans-in the pin count. Similarly, the illustrated bus 30 is connected to the processor 20 via an intermediate bus or device or other interface 25 that fans-out or fans-in the pin count. As will be apparent to those skilled in the art having benefit of this disclosure, either or both or none of the interfaces 15 and 25 may be used as desired and as needed by the pin-out of the processors 10 and 20.

Referring now to FIGS. 2–5, illustrated are the signals contained on the bi-directional data and command bus 40, and on the bi-directional control line 50, for each of various clocks of the clock line 60, during various read and write operations, in an embodiment of the present invention. In each of FIGS. 2–5, the signal labeled CTRL contained on the bi-directional control line 50, has locations marked with a circle, and locations marked with a triangle. A circle indicates that the master is driving the bi-directional data and command bus 40 and the slave is monitoring the bi-directional control line 50; a triangle indicates that the slave is driving the bi-directional control line 50 and the master is monitoring the control line 50.

Figure 2:
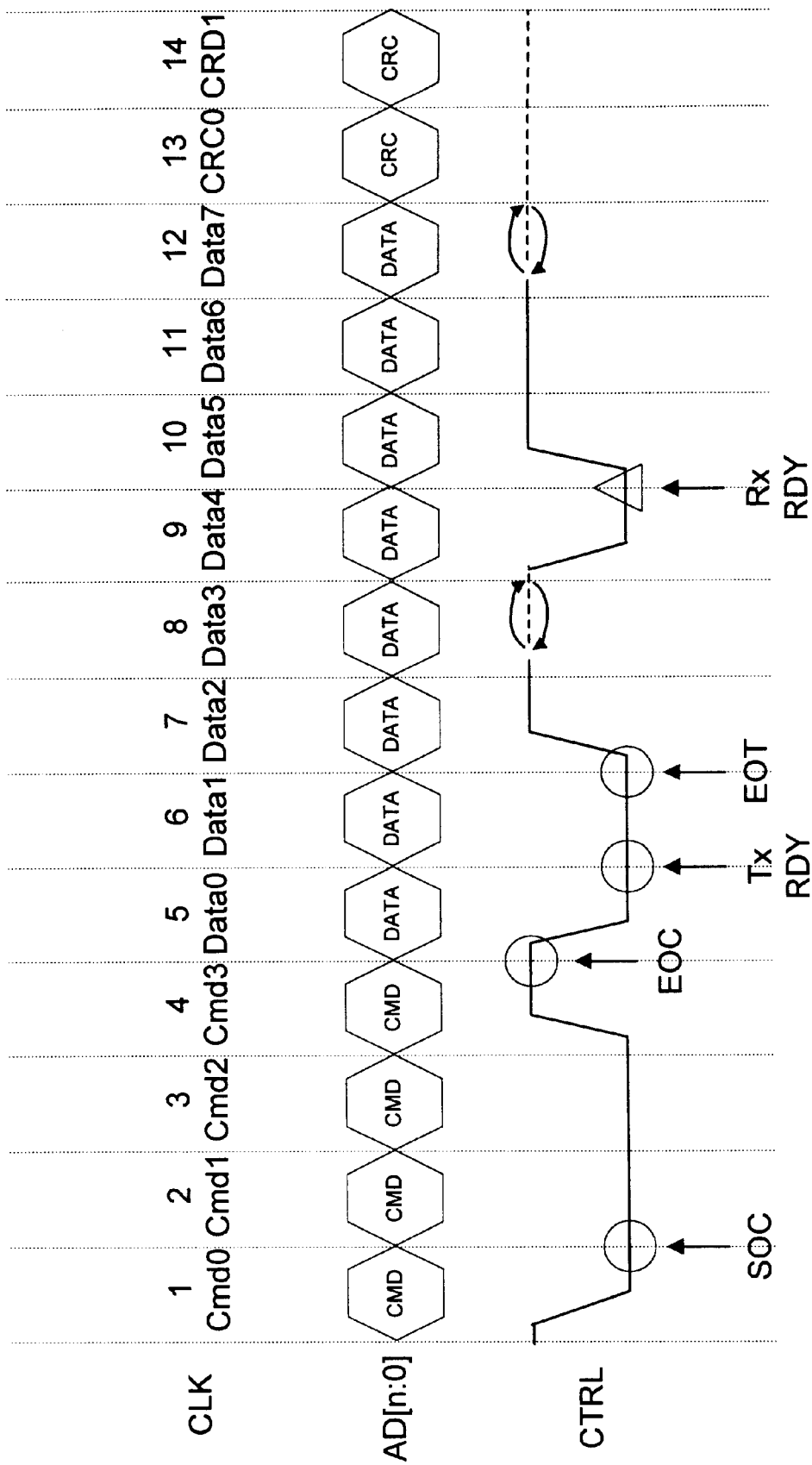
FIG. 2 is a waveform diagram of signals on a bus during a data write operation having no wait states, according to an embodiment of the present invention.

With continued reference to FIGS. 2–5, sequential clocks, for example, 1, 2 . . . , 14 in FIG. 2, are illustrated for the clock signal CLK contained on clock line 60. Labeling has been added to identify clocks occurring during the command phase (Cmd0, Cmd1, Cmd2, Cmd3), the data transfer phase (Data0, Data1 . . . , Data7), and the error check phase (CRC0, CRC1). In FIG. 2, during clock 8, a pair of opposite arrows are illustrated on the CTRL signal; such a pair of opposite arrows indicates that the bi-directional control line 50 is floated, and may change direction on the next clock.

The bi-directional data and command bus 40 is labeled AD[n:0] in FIG. 1. This bus is shown with a variable index because its width is scaleable, either four or eight bits, in one embodiment of the present invention. The bus 40 carries address information and command information from the master to the slave during the command phase of a transfer. During the data transfer phase, the bus 40 carries data from the master to the slave for a write operation, and from the slave to the master for a read operation. The bus 40 is a bi-directional bus.

The control line 50 is a bi-directional line between the host computer 10 and the co-processor 20. It serves to specify start and end of a transfer, sender and receiver flow control, and other status and control information. The meaning of the signal on the control line 50 is dependent on where in a transfer it occurs. The control line 50 is driven low during the Data0 clock of both reads and writes, to indicate that the data sender is ready to send data. During the Data1 clock, a low signal on control line 50 indicates to the receiver that the current octet of data is the last octet of the transfer. When the direction of data flow on the bus 40 is to change direction, the control line 50 is driven high during the Data2 clock, and then floated during the Data3 clock.

The data sender drives the control line 50 during the Data4 clock. If the data receiver can accept the next octet of data, it drives the control line 50 low; if the data receiver cannot accept the next octet of data, the control line 50 is allowed to remain high, and is subsequently driven low on a subsequent data cycle by the data receiver, once the data receiver can accept more data.

The direction of the data and command bus 40 changes depending on whether the transfer is a write operation or a read operation. The direction of the control line 50 changes depending on whether the transfer is a read operation or a write operation, and at what clock during the transfer the control line 50 is being driven. In one embodiment of the present invention, both read and write operations start with the master driving the bi-directional data and control bus 40 and the bi-directional control line 50, for the duration of the command phase. In write operations in that embodiment, the master continues to drive the bus 40 for the duration of the data transfer phase; for read operations, there is a two clock bus turnaround interval after the end of the command phase, and then the slave drives the bus 40 for the duration of the data transfer phase. The direction of the control line 50 is turned around once for write operations and twice for read operations. The turning around of the control line 50 permits back channel signaling from the data receiver to the data sender.

Referring now to FIG. 2, a write operation with no wait states is illustrated. The write operation begins with a command phase, during which the master drives command information onto the bi-directional data and command bus 40, while driving the bi-directional control line 50 low. In FIG. 2, command information is shown in the AD[n:0] waveform by use of the term "CMD" during clocks 1, 2, 3, and 4. With continued reference to FIG. 2, during clock 1, the CTRL waveform is shown being driven from a high to a low.

In the illustrated embodiment, the command phase lasts for four clocks, labeled Cmd0, Cmd1, Cmd2, and Cmd3 in FIG. 2. During each of those clocks, the master outputs new command information onto the bi-directional data and command bus 40. Then, on the last clock of the command phase, during the clock label Cmd3, the master drives the bi-directional control 1 line 50, and thus the CTRL signal in FIG. 2, high. No flow control occurs during the command phase in the illustrated embodiment; once the master begins outputting command information, it outputs all of its command information, and the slave accepts all that command information.

In a particular embodiment of the present invention, the minimum length of the command phase is four clocks. This guarantees that the CTRL signal will remain low for at least two clocks. As will be apparent to those skilled in the art having benefit of this disclosure, other minimum lengths may be used as desired.

Figure 3:
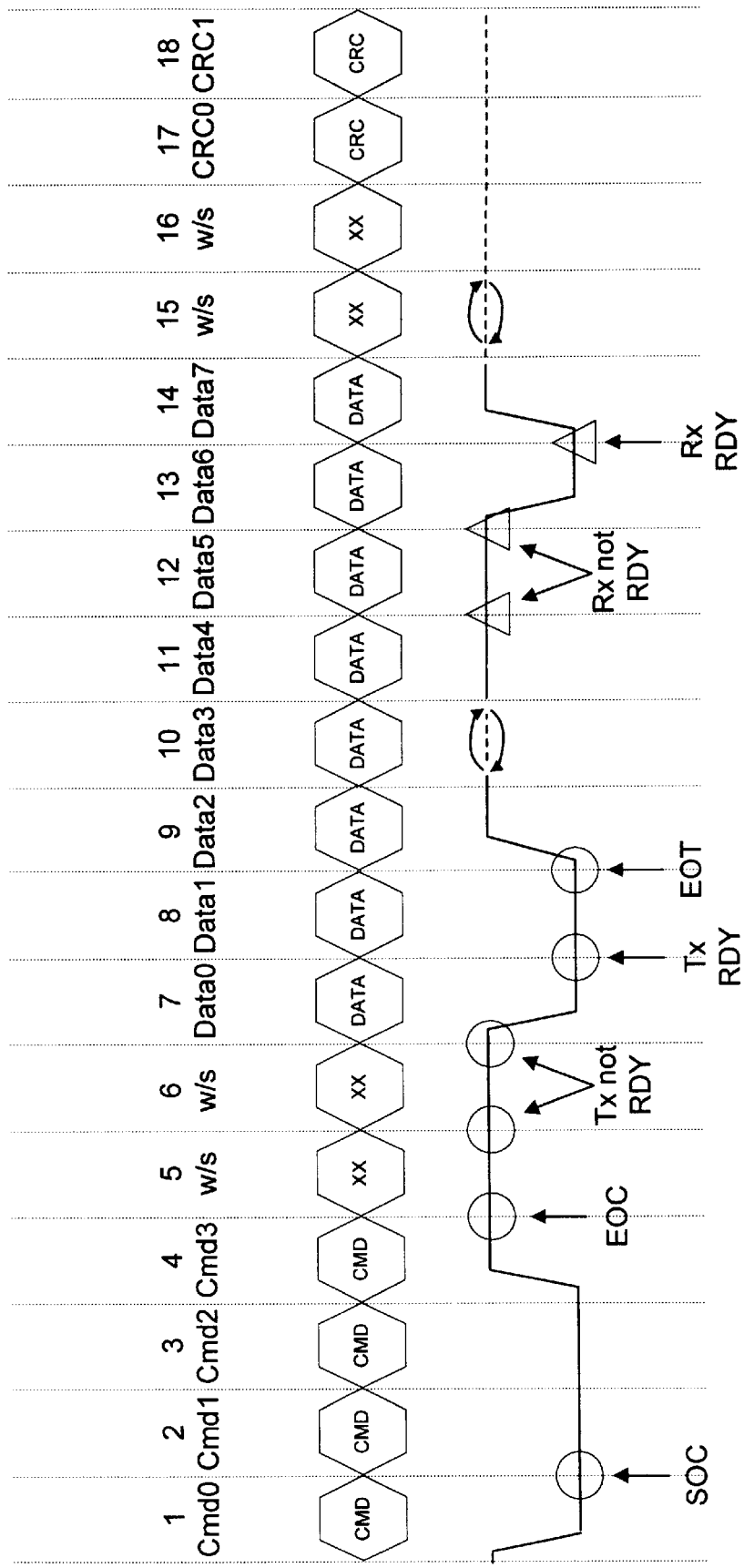
FIG. 3 is a waveform diagram of signals on a bus during a data write operation having wait states, according to an embodiment of the present invention.

With continued reference to the CTRL signal illustrated in FIG. 2, the label SOC indicates the start of the command phase, and the label EOC indicates the end of the command phase; after the command phase, is the data transfer phase. The data transfer phase may be delayed by wait states, as illustrated in FIG. 3 during clocks 5 and 6, as will be discussed more fully below.

During such wait states, the CTRL signal remains in the high state. Thus the only time that the CTRL signal is low for two or more clocks is between the start of the command phase (SOC) and the end of the command phase (EOC); at no other time during signaling is the CTRL signal low for more than two clocks. Consequently, a start of a data transfer can be uniquely identified by observing the CTRL signal being low for two or more clocks.

More precisely, the zero to one transition of the CTRL signal on the last clock of the command phase delineates the end of the command phase. Similarly, the one to zero transition of the CTRL signal during clock 1 delineates the beginning of the command phase. In FIG. 2, the labels SOC and EOC have been conveniently added at the beginning of the next clock immediately following these transitions.

After the command phase has ended, the master may start transmitting data. As illustrated in FIG. 2, transmission of data commences in clock 5; as illustrated in FIG. 3, transmission of data commences in clock 7 after clocks 5 and 6 are spent in a wait state, as will be discussed more fully below.

In one embodiment of the present invention, data is always sent in a granularity of eight consecutive clocks. This is known as an octet. Each octet of data is called a packet. Thus, during eight clocks, a single packet of data is transmitted, with that packet containing an octet of data. As will be apparent to those skilled in the art having benefit of this disclosure, other granularities may be used as desired.

Data is transmitted a packet at a time. During the data transfer phase one packet of data may be transmitted, two packets of data may be transmitted, and so forth; an integer number of packets may be transmitted, where that integer equals 1, 2, 3 . . . . The minimum amount of data which may be transmitted is a single packet. As illustrated in FIG. 2, a single packet of data consisting of a first clock of data (shown by use of the term "DATA" in the AD[n:0] signal) during clock 5, a second clock of data during clock 6, a third clock of data during clock 7, and so forth for clocks 5 through 12, which clocks have been labeled Data0-Data7. Although more than one packet of data may be transmitted during a data transfer phase in accordance with the present invention, the transmission of a single packet is illustrated in FIG. 2.

Flow control may be exercised by either the processor sending the data, or by the processor receiving the data. In one embodiment of the present invention, any flow control delays required by the data sender occurs at the beginning of an octet of data. With continued reference to FIG. 2, the data sender indicates it is ready to immediately send data by driving the CTRL signal low during clock 5, as shown by the label Tx RDY. Had the data sender not been ready to immediately begin sending data, the data sender would have held the CTRL signal high until it was ready to send data, as illustrated in FIG. 3 during clocks 5 and 6. With reference to both FIGS. 2 and 3, when the data sender is ready to immediately start sending data, it drives the CTRL signal low, and places the first clock of data onto the bi-directional data and command bus 40, as shown by the waveform AD[n:0] at clock 5 in FIG. 2 and at clock 7 in FIG. 3. Once again, the transition of the CTRL signal from high to low delineates the transmitter ready condition, which is conveniently labeled Tx RDY at the beginning of the next clock in the Figures.

The data receiver may also exert flow control. In the illustrated embodiment, this is done during the fourth clock of data, occurring at clock 9 in FIG. 2, labeled Rx RDY for receiver ready, and at clock 11 in FIG. 3, labeled Rx not RDY for receiver not ready. Asserting receiver flow control during the fourth clock of data permits the data sender three clocks to receive the signal and to either begin the sending of the next octet of data or delay the sending of the next octet of data. With reference to FIG. 2, receiver ready (Rx RDY) is indicated at the beginning of clock 10, but the master need not decide what to send until the beginning of clock 13. As illustrated in FIG. 2, error check information is sent in clock 13; the master, however, might have sent the first clock of a second octet of data.

Given that multiple octets of data may be transmitted during a single data transfer phase, the present invention provides for indication of the end of the data transfer phase. With continued reference to FIG. 2, the data sender indicates that the current octet is the last in a data transfer by driving the CTRL signal low on the clock immediately following the assertion of transmitter ready (Tx RDY). This end of transfer is labeled EOT on the CTRL waveform illustrated in FIG. 2. End of transfer signals the data receiver that the current octet of data is the last octet of the current data transfer phase, and that the error check phase will begin next. In one particular embodiment of the present invention, the error check phase consists of a two clock cyclic redundancy check (CRC).

When the end of transfer occurs, the master drives the CTRL signal high during the Data2 clock in preparation for floating the control line 50 during the Data3 clock, as shown by the pair of opposite arrows on the CTRL signal illustrated in FIG. 2. By reversing the direction of the bi-directional control line 50 in this manner, the present invention provides a back channel in which the data receiver can assert flow control in the event flow control is needed. During the Data4 clock, the receiver indicates whether it can accept the next octet of data or the CRC by asserting receiver ready (Rx RDY): the CTRL signal being low means that flow control is not asserted and the receiver is ready to receive the next octet of data or the CRC; being high means that flow control is asserted and the receiver is not ready to receive the next octet of data or the CRC. Such receiver control may delay when the data sender starts sending the next octet of data or the CRC; however, it does not affect the octet presently being sent, which the data receiver must accept. Providing such flow control in the middle of a data write operation permits the flow control signaling to propagate back to the sender and gives the sender time to delay transmitting the next octet of data, thereby pipelining the flow control delay with the current write operation.

With reference to FIG. 3, a write operation is illustrated having both transmitter and receiver wait states. During clocks 5 and 6, "don't care" information is on the bi-directional data and command bus 40, as shown by the term "xx" in the AD[n:0] waveform. The wait states in clocks 5 and 6 results from the transmitter not ready signal (Tx not RDY) in the CTRL signal illustrated in FIG. 3. Because the data sender is not ready to transmit data at the end of the command phase, the CTRL signal remains high after the end of the command phase, labeled EOC in FIG. 3. Once the data sender is ready to transmit data, the data sender drives the CTRL signal low, as shown in clock 7 in FIG. 3, and places the first clock of data onto the bi-directional data and command bus 40. With continued reference to FIG. 3, wait states are also shown during clocks 15 and 16, resulting from the data receiver not being ready to receive data, as shown by the two receiver not ready (Rx not RDY) conditions at the beginning of clocks 12 and 13.

Figure 4:
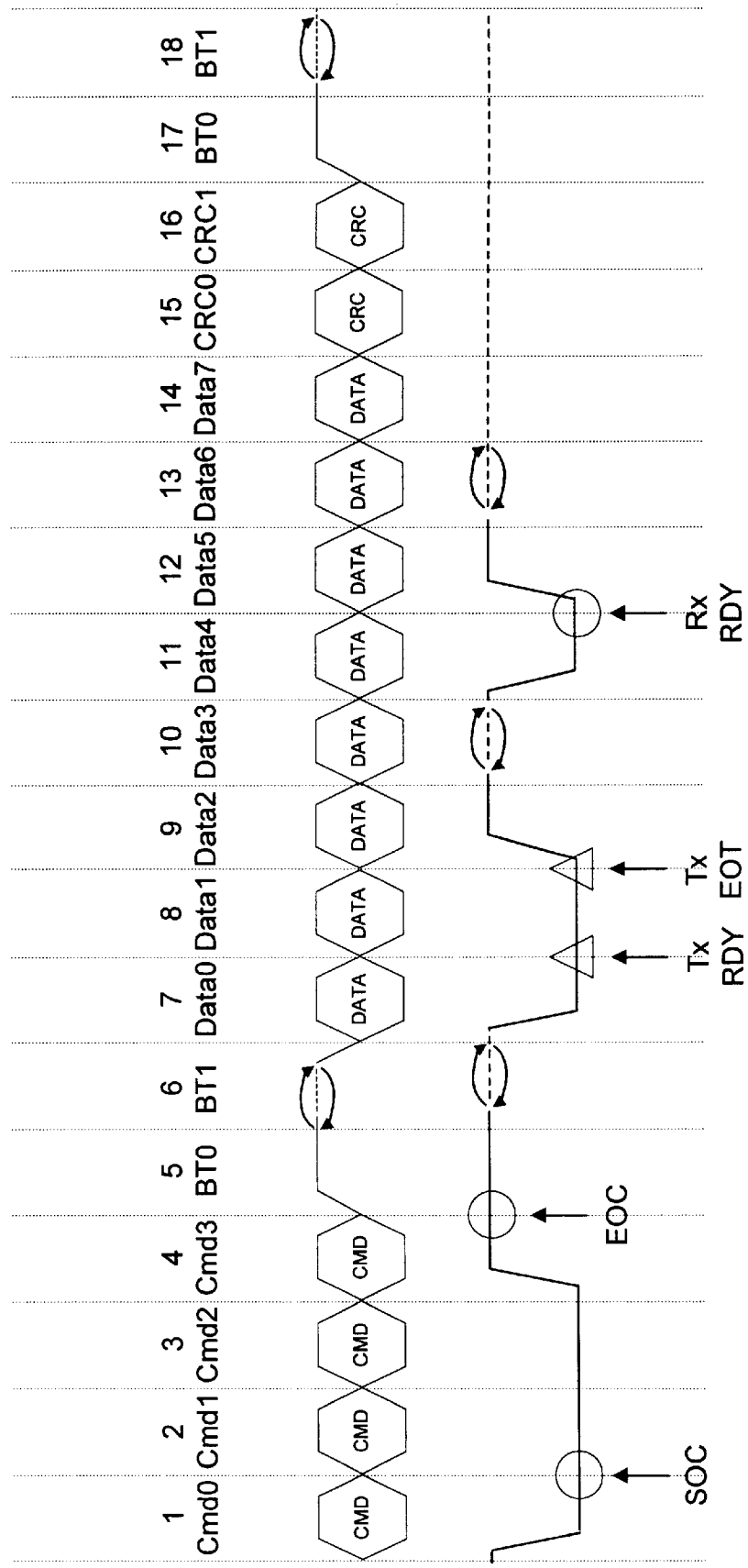
FIG. 4 is a waveform diagram of signals on a bus during a data read operation having no wait states, according to an embodiment of the present invention.
Figure 5:
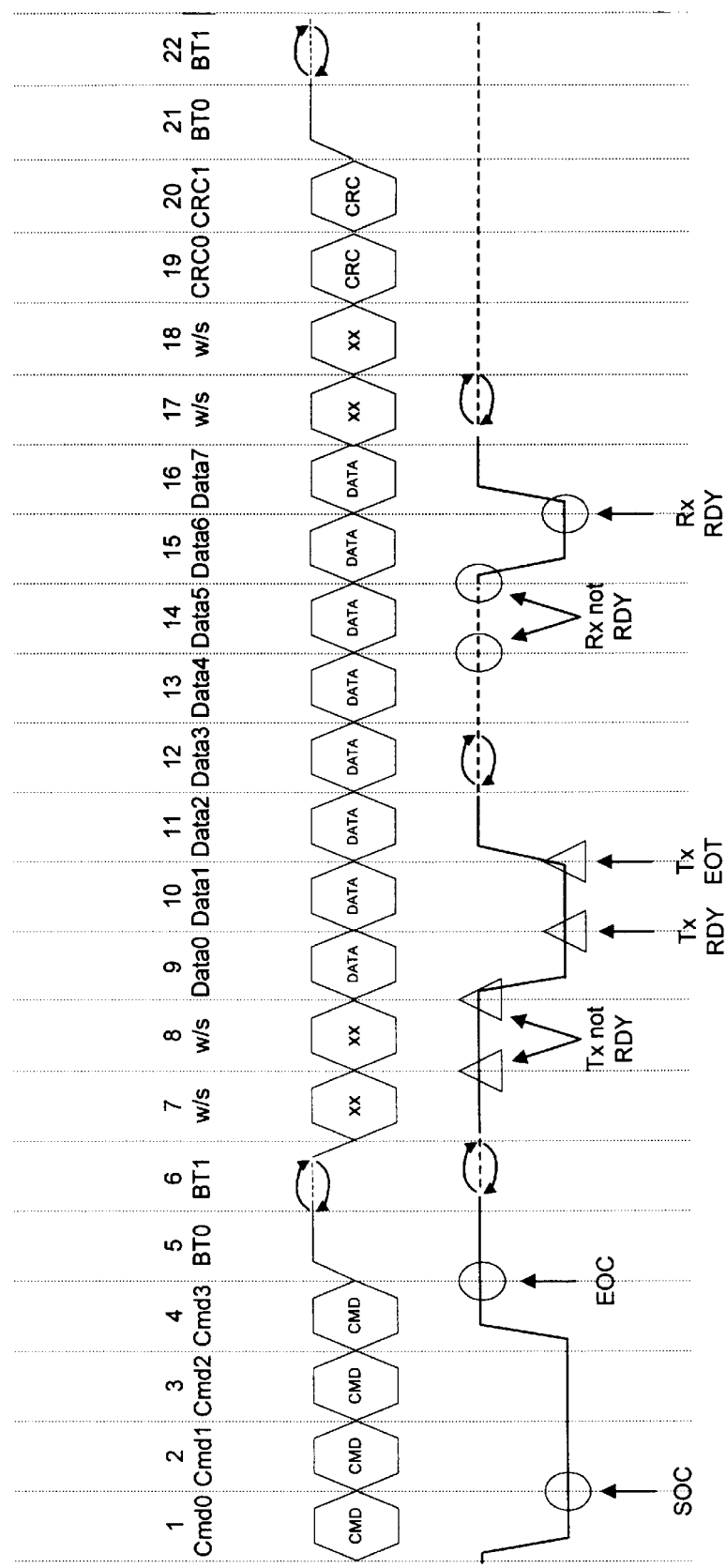
FIG. 5 is a waveform diagram of signals on a bus during a data read operation having wait states, according to an embodiment of the present invention.

Referring now to FIG. 4, a data read operation is illustrated. Data read operations are similar to data write operations, except that the direction of the bi-directional data and command bus 40 and of the bi-directional control line 50 both must be reversed, that is, turned around, at the end of the command phase. This introduces a two clock delay between the end of the command phase and start of the data transfer phase, shown by the labels BT0 and BT1 in clocks 5 and 6, denoting bus turn around 0 and bus turn around 1. After the bus is turned around, the data transfer phase begins in clock 7 with the first clock of data being placed on the bi-directional data and command bus 40, as shown in the AD[n:0] waveform of FIG. 4. The pair of opposite arrows on both the AD[n:0] waveform and the CTRL waveform during clock 6 indicates that bus 40 and control line 50 are each floated and then change direction during the next clock. FIG. 5 illustrates a read operation with both transmitter and receiver wait states.

With continued reference to FIGS. 4 and 5, flow control for read operations is symmetric to flow control for write operations. Transmitter ready (Tx RDY) controls data sender flow, except that for data read operations the data sender is the slave; receiver ready (Rx RDY) controls data receiver flow, with the data receiver being the master. If the data sender cannot supply an entire octet of data, it delays assertion of transmitter ready (Tx RDY) and drives the CTRL signal high; if the data sender is ready to supply an entire octet of data, it drives the CTRL signal low, and supplies the entire octet of data. And, if the current octet is the last octet of data in the current data transfer phase, the data sender asserts an end of transfer, labeled Tx EOT in FIGS. 4 and 5, on the clock immediately following the assertion of transmitter ready (Tx RDY).

With continued reference to FIG. 4, the CTRL signal is driven high after the Data1 clock, and floated during the Data2 and Data3 clocks, in preparation for turning the control line 50 around at the start of the Data4 clock, as indicated by the pair of opposite arrows on the CTRL waveform. The data receiver asserts flow control at the start of the Data4 clock. Data receiver flow control for read operations indicates whether the receiver is ready to accept the next octet of data or the CRC. If the data receiver can immediately accept either, it asserts receiver ready (Rx RDY) by driving the CTRL signal low; if the data receiver is not ready to accept the next octet of data or the CRC, it holds the CTRL signal high until it is ready. Receiver flow control, however, only applies to the next octet of data or the CRC; it does not apply to the octet presently being received, which the data receiver accepts in its entirety.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus comprising:
   a bi-directional data and command bus to transfer command information and data between a central processing unit (CPU) and a co-processor;
   a bi-directional control line to provide control information to the CPU and the co-processor; and
   a clock line to provide a clock signal to synchronize signals driven on the data and command bus and the control line.

2. An apparatus comprising:
   a co-processor bus to transfer data between a central processing unit (CPU) and a co-processor during read operations and/or write operations, the operations having a command phase, a data transfer phase, and an error check phase, the co-processor bus comprising,
   (a) a bi-directional data and command bus to transfer command information from the CPU to the co-processor during the command phase of a read or write operation, to transfer data from the CPU to the co-processor during the data transfer phase for a write operation, and to transfer data from the co-processor to the CPU during the data transfer phase for a read operation;
   (b) a bi-directional control line to provide a signal to specify the start and end of a transfer; and
   (c) a clock line to provide a clock signal to synchronize signals driven on the data and command bus and the control line.

3. A system comprising:
   a host central processing unit (CPU);
   a security co-processor; and
   a security co-processor bus coupled to the host CPU and to the security co-processor, the security co-processor bus having a bi-directional data and command bus to transfer command information and data between the host CPU and the co-processor, a bi-directional control line to provide control information, and a clock line to provide a clock signal to synchronize signals driven on the data and command bus and the control line.

4. A system comprising:
   a host central processing unit (CPU);
   a security co-processor; and
   a security co-processor bus coupled to said host CPU and to said security co-processor to transfer data between the host CPU and the co-processor during read operations and/or write operations, the operations having a command phase and a data transfer phase, the security co-processor bus comprising,
   (a) a bi-directional data and command bus to transfer command information from the host CPU to the co-processor during the command phase of a read or write operation, to transfer data from the host CPU to the co-processor during the data transfer phase for a write operation, and to transfer data from the co-processor to the host CPU during the data transfer phase for a read operation;
   (b) a bi-directional control line to provide a signal to specify the start and end of a transfer; and
   (c) a clock line to provide a clock signal to synchronize signals driven on the data and command bus and the control line.

5. A system comprising:
   a first processor;
   a second processor; and
   a processor bus coupled to the first processor and to the second processor to transfer data between the first and second processors during read operations and/or write operations, the operations having a command phase and a data transfer phase, the processor bus comprising,
   (a) a bi-directional data and command bus to transfer command information from the first processor to the second processor during the command phase of a read or write operation, and to transfer data from the first processor to the second processor during the data transfer phase for a write operation, and to transfer data from the second processor to the first processor during the data transfer phase for a read operation,
   (b) a bi-directional control line to provide a signal to specify the start and end of a transfer, and
   (c) a clock line to provide a clock signal to synchronize data driven on the data and command bus and the control line.

6. The system of claim 5, comprising:
   an interface disposed between the first processor and the processor bus, coupled to the first processor and to the processor bus, and matching the pin-out of the first processor to the pin-out of the processor bus.

7. The system of claim 5, comprising:
   an interface disposed between the second processor and the processor bus, coupled to the second processor and to the processor bus, and matching the pin-out of the second processor to the pin-out of the processor bus.

8. The system of claim 5, comprising:
   a first interface disposed between the first processor and the processor bus, coupled to the first processor and to the processor bus, and matching the pin-out of the first processor to the pin-out of the processor bus, and
   a second interface disposed between the second processor and the processor bus, coupled to the second processor and to the processor bus, and matching the pin-out of the second processor to the pin-out of the processor bus.

9. A method comprising:
   synchronizing signals driven on a bi-directional data and command bus and a bi-directional control line of a co-processor bus with a signal provided on a clock line of the co-processor bus;
   executing a command phase, during which command information is transmitted via the co-processor bus between a central processing unit (CPU) and a co-processor;
   executing a data transfer phase, during which a packet of data is transmitted via the co-processor bus between the CPU and the co-processor; and
   optionally executing an error check phase, during which the data transferred during the data transfer phase is checked for error.

10. The method of claim 9, wherein the data transfer phase has a duration of eight clocks, and the packet of data is an octet of data.

11. A method comprising:
- synchronizing signals driven on a bi-directional data and command bus and a bi-directional control line of a security co-processor bus with a clock signal provided on a clock line of the security co-processor bus;
- executing a command phase, having a duration of a first number of clocks, during which command information is transmitted via said security co-processor bus between a host central processing unit (CPU) and a security co-processor;
- executing a data transfer phase, having a duration of a second number of clocks, said second number of clocks being equal to M×N, where both M and N are positive integers, and wherein during each M group of N consecutive clocks a packet of data is transmitted via the security co-processor bus between the host CPU and the security co-processor; and optionally executing an error check phase, having a duration of a third number of clocks, during which the data transferred during the data transfer phase is checked for error.

12. The method of claim 11, wherein N equals 8, and the packet of data is an octet of data.

13. The method of claim 11, wherein executing a command phase comprises:
- specifying whether the transfer of data during the subsequent data transfer phase will be a read operation or a write operation; and
- specifying a target address.

14. The method of claim 13, comprising:
- determining the host central processing unit (CPU) will be a data sender and the security co-processor will be a data receiver during the data transfer stage for a write operation; and
- determining the security co-processor will be the data sender and the host CPU will be the data receiver during the data transfer phase for a read operation.

15. The method of claim 14, comprising:
- driving the control line low by the host central processing unit (CPU);
- driving command information on to the data and command bus by the host CPU, the host CPU driving new command information on each subsequent clock, for the duration of the command phase; and
- driving the control line high on the last clock of the command phase by the host CPU.

16. The method of claim 14, comprising:
- driving the control line low by the data sender, indicating the data sender is ready to send data; and
- placing a first clock of data on to the data and command bus by the data sender.

17. The method of claim 16, comprising driving the control line low by the data sender in the clock immediately following the data sender placing said first clock of data on to the data and command bus, indicating to the data receiver that the current data packet is the last data packet of the current data transfer phase.

18. The method of claim 14, comprising reversing the direction of the data and command bus at the end of the command phase for a read operation.

19. The method of claim 14, comprising reversing the direction of the data and command bus at the end of the error check phase for a read operation.

20. The method of claim 13, comprising driving the bi-directional control line high by the data sender, indicating the data sender is not ready to send data.

21. The method of claim 13, comprising driving the control line low by the data receiver, indicating the data receiver is ready to accept data.

22. The method of claim 13, comprising driving the control line high by the data receiver, indicating the data receiver is not ready to accept data.

23. The method of claim 11, wherein said first number of clocks equals at least four clocks.

24. The method of claim 11 wherein the third number of clocks equals two clocks.

25. A system comprising:
- a processor;
- a co-processor; and
- a bus coupled to the processor and to the co-processor, the bus having a plurality of bi-directional data and command lines to transfer command information and data between the processor and the co-processor, a bi-directional control line to provide control information to the processor and the co-processor, and a clock line to provide a clock signal to synchronize signals driven on the data and command lines and the control line.

26. The system of claim 25, wherein the processor transfers command information to the co-processor during a command phase of a read and/or write operation, the processor transfers data to the co-processor during a data transfer phase of a write operation, and the co-processor transfers data to the processor during the data transfer phase of a read operation.

27. The system of claim 26, wherein the processor transfers error check data to the co-processor during an error check phase of a write operation, and the co-processor transfers error check data to the processor during the error check phase of a read operation.

28. A method comprising:
- transferring command information from a first device to a second device via a bi-directional command and data bus during a command phase of a read and/or write operation;
- transferring data between the first device and the second device via the command and data bus during a data transfer phase of a read and/or write operation;
- providing control information to the first device and the second device via a bi-directional control line; and
- synchronizing signals driven on the command and data bus and on the control line with a clock signal provided on a clock line.

29. The method of claim 28, wherein transferring data between the first device and the second device comprises:
- transferring data from the first device to the second device for a write operation; and
- transferring data from the second device to the first device for a read operation.

30. The method of claim 28, comprising:
- transferring error check data between the first device and the second device during an error check phase.

31. The method of claim 30, wherein the error check data comprises cyclic redundancy check (CRC) data for the data transferred during the data transfer phase.

32. The method of claim 30, comprising waiting at least one clock cycle after the data transfer phase before transferring error check data during the error check phase.

33. The method of claim 28, comprising waiting at least one clock cycle after the command phase before transferring data during the data transfer phase.

* * * * *

UNITED STATES PATENT AND TRADEMARK OFFICE
CERTIFICATE OF CORRECTION

PATENT NO. : 6,434,650 B1
DATED : August 13, 2002
INVENTOR(S) : Moriss et al.

It is certified that error appears in the above-identified patent and that said Letters Patent is hereby corrected as shown below:

<u>Title page,</u>
Item [75], Inventors, delete "Morris" and insert -- Morriss --.

Signed and Sealed this

Twenty-seventh Day of April, 2004

JON W. DUDAS
*Acting Director of the United States Patent and Trademark Office*